(12) United States Patent
Kollmuss et al.

(10) Patent No.: US 10,442,638 B2
(45) Date of Patent: Oct. 15, 2019

(54) METHOD AND APPARATUS FOR CONVEYING ARTICLES, PIECE GOODS AND/OR BUNDLES WITHIN AT LEAST TWO CONVEYING PATH SECTIONS

(71) Applicant: KRONES Aktiengesellschaft, Neutraubling (DE)

(72) Inventors: Manuel Kollmuss, Raubling (DE); Richard Eschlbeck, Vogtareuth (DE)

(73) Assignee: KRONES Aktiengesellschaft, Neutraubling (DE)

( * ) Notice: Subject to any disclaimer, the term of this patent is extended or adjusted under 35 U.S.C. 154(b) by 97 days.

(21) Appl. No.: 15/524,364

(22) PCT Filed: Nov. 2, 2015

(86) PCT No.: PCT/EP2015/075455
§ 371 (c)(1),
(2) Date: May 4, 2017

(87) PCT Pub. No.: WO2016/074972
PCT Pub. Date: May 19, 2016

(65) Prior Publication Data
US 2018/0229948 A1  Aug. 16, 2018

(30) Foreign Application Priority Data
Nov. 14, 2014  (DE) .......... 10 2014 223 319

(51) Int. Cl.
*B65G 57/10* (2006.01)
*B65G 57/06* (2006.01)
(Continued)

(52) U.S. Cl.
CPC ............. *B65G 57/10* (2013.01); *B65G 57/06* (2013.01); *B65G 57/24* (2013.01); *B65G 65/02* (2013.01);
(Continued)

(58) Field of Classification Search
CPC ........ B65G 57/10; B65G 65/02; B65G 57/06; B65G 57/24; B65G 2207/14; B65G 2203/0233; B65G 2203/0225
(Continued)

(56) References Cited

U.S. PATENT DOCUMENTS 3,486,637 A  12/1969  Hahn
3,782,562 A *  1/1974  Burt ................... B65G 59/026
                                                        414/789.6
(Continued)

FOREIGN PATENT DOCUMENTS

CN  103803291  5/2014
DE  10219129  11/2003
(Continued)

OTHER PUBLICATIONS

PCT/EP2015/075455 International Preliminary Report on Patentability dated May 16, 2017.
(Continued)

*Primary Examiner* — Lynn E Schwenning
(74) *Attorney, Agent, or Firm* — Simmons Perrine Moyer Bergman PLC

(57) ABSTRACT

The invention relates to a palletizing apparatus (10) and a method for conveying articles (16), piece goods, and/or bundles (18) and/or palletizable article layers, piece good layers, and/or bundle layers (20) with at least two conveyor line sections (12, 14), each in a particular conveying direction (28, 29). Each conveyor line sections include consecutive handling stations, grouping stations, and/or transfer stations (32, 33, 40, 44, 48, 50), which lead to a central loading station (24), where the article layers, piece good layers, and/or bundle layers (20) are stacked on top of each other and/or palletized in a common loading place (25). The loading station (24) is located between at least two vertically
(Continued)

adjustable support surfaces and/or conveying surfaces (52). The common loading place (25) is supplied with article layers, piece good layers, and/or bundle layers (20).

18 Claims, 5 Drawing Sheets

(51) Int. Cl.
*B65G 57/24* (2006.01)
*B65G 65/02* (2006.01)

(52) U.S. Cl.
CPC .............. *B65G 2203/0225* (2013.01); *B65G 2203/0233* (2013.01); *B65G 2207/14* (2013.01)

(58) Field of Classification Search
USPC ............................. 414/788.1, 789.6, 790.9
See application file for complete search history.

(56) References Cited

U.S. PATENT DOCUMENTS

| | | | | |
|---|---|---|---|---|
| 5,372,472 A * | 12/1994 | Winski | ............... | B65G 47/086 |
| | | | | 414/789.6 |
| 5,540,545 A * | 7/1996 | Roberts | ............... | B65G 57/245 |
| | | | | 414/789.6 |
| 5,769,599 A | 6/1998 | Schnabel et al. | | |
| 5,844,807 A | 12/1998 | Anderson et al. | | |
| 5,944,479 A * | 8/1999 | Kanaya | ............... | B65G 57/24 |
| | | | | 198/431 |
| 5,971,699 A * | 10/1999 | Winski | ............... | B65G 57/245 |
| | | | | 414/791.6 |
| 6,264,422 B1 * | 7/2001 | Hennes | ............... | B65G 47/086 |
| | | | | 414/791.6 |
| 6,846,147 B2 * | 1/2005 | Maser | ............... | B65G 49/085 |
| | | | | 414/331.09 |
| 7,422,097 B2 | 9/2008 | Oppici | | |
| 8,096,404 B2 * | 1/2012 | Eschlbeck | ............ | B65G 1/1378 |
| | | | | 198/429 |
| 8,991,586 B2 | 3/2015 | Hirschek | | |
| 9,340,369 B2 * | 5/2016 | Beer | ............... | B65G 47/52 |
| 9,643,801 B2 * | 5/2017 | Beer | ............... | B65G 47/841 |
| 9,862,552 B2 * | 1/2018 | Beer | ............... | B65G 47/766 |
| 2012/0027555 A1 | 2/2012 | Germain et al. | | |
| 2016/0280475 A1 * | 9/2016 | Kollmuss | ............ | B65G 57/03 |

FOREIGN PATENT DOCUMENTS

| | | |
|---|---|---|
| DE | 69628245 | 4/2004 |
| DE | 10320321 | 12/2004 |
| DE | 102011080812 | 2/2013 |
| EP | 0498263 | 8/1992 |
| EP | 1046598 | 10/2000 |
| GB | 1599046 | 9/1981 |
| WO | WO-2013135536 A1 * | 9/2013 ........... B65G 47/841 |

OTHER PUBLICATIONS

Corresponding Chinese Patent Application—First Office Action dated Aug. 28, 2018.
DE 10 2014 223 319.4 German Patent Application—German Search Report dated Jul. 9, 2015.
PCT/EP2015/075455 European PCT Application—International Search Report dated Feb. 3, 2016.

* cited by examiner

US 10,442,638 B2

METHOD AND APPARATUS FOR CONVEYING ARTICLES, PIECE GOODS AND/OR BUNDLES WITHIN AT LEAST TWO CONVEYING PATH SECTIONS

CLAIM OF PRIORITY

The present application is a national stage application of International Application PCT/EP2015/075455, filed Nov. 2, 2015, which in turn claims priority to German Application DE 10 2014 223 319.4, filed Nov. 14, 2014, all of which are incorporated by reference.

FIELD OF THE INVENTION

The present invention relates to a palletizing apparatus of at least two conveyor line sections for conveying articles, piece goods, and/or bundles and/or palletizable article layers, piece good layers, and/or bundle layers.

The invention moreover relates to a method for conveying articles, piece goods, and/or bundles and/or palletizable article layers, piece good layers, and/or bundle layers within at least two conveyor line sections.

BACKGROUND OF THE INVENTION

In known packaging and palletizing facilities, articles, packages, and piece goods are conveyed on transport tracks and shifted or aligned in a manner suitable for producing desired layer patterns, which can be subsequently stacked on pallets An apparatus is known from EP 1 046 598 A1 for handling packages of containers, such as bottles or tin cans, which are to be arranged by the apparatus in a predetermined configuration for a transport on pallets. The apparatus comprises a station for aligning and separating the packages, where the station has a multitude of parallel diagonal guides, which are each provided with movable gripping elements. Each of the gripping elements picks up a package and aligns it according to a desired arrangement or configuration of the other packages. The packages are fed to the stations in one row or in a plurality of rows by means of a conveyor belt.

DE 603 13 039 T2 also discloses an apparatus and a method for arranging and aligning packages. A method and an apparatus are moreover known from DE 102 19 129 A1 for rotating and distributing or bringing together so-called packs, which are fed in at least one supply lane and discharged in an arrangement rotated by 90 degrees in at least one outlet lane running parallel to the supply lane or to the supply lanes. In this method, in each case at least two packs are seized and rotated as a group, in each case by 90 degrees.

In order to be able to form a stackable article layer, it is generally necessary to have a predefined number of articles, which have to be grouped and pushed together. In addition to the one feeder belt of the grouping station, there is a further feeder belt arranged parallel to the first feeder belt for the purpose of being able to increase the grouping capacity and, directly connected therewith, the palletizing capacity. The grouping station or, as the case may be, its control can preferably be programmed such that articles are shifted and/or rotated and relocated to a predefined position alternately from the first and from the at least one further feeder belt. It is also possible that several such grouping tables are arranged one after the other, with the first grouping table being associated with two feeder belts, for example. In this way, the capacity can be increased once more by one article, for example, from the first feeder belt being positioned by the first grouping table or, as the case may be, by its manipulator, and by a further article from the second feeder belt passing the first grouping table uninterruptedly and being positioned by the second grouping table or, as the case may be, by its manipulator.

In known palletizing facilities and methods for palletizing, packages, piece goods or bundles are fed in rows that are uninterrupted, continuous, or interrupted by gaps by means of one, two or more parallel transport tracks to at least one grouping table with at least one manipulator, where the packages, piece goods or bundles are rotated and shifted by means of the manipulator or, as the case may be, by the manipulators in such a manner that they form a stackable and/or palletizable layer, which is subsequently transferred to a palletizing apparatus for the purpose of stacking and/or forming layers. Such a palletizing apparatus comprises at least one transfer station, which is normally arranged upstream from a loading station and is preferably vertically adjustable in order to be able to deposit in each case individual, complete article layers at a desired height on a stacking location, for example, on a pallet, with the transfer station and the loading station interacting with each other. It is also possible for a plurality of such transfer stations to be arranged one after the other with at least one loading station following. Since each vertical movement of each transfer station requires time, it is not the actual palletizing, but rather the transfer of the article layers from the grouping stations to the proper depositing location and the vertical positioning of said article layers that usually form the limiting factors for the performance of such a machine.

The primary object of the present invention lies in providing a method and an apparatus for palletizing packages, piece goods, bundles, or articles, which method and apparatus have an increased palletizing capacity, that is, they can palletize faster than hitherto known facilities and methods.

SUMMARY OF THE INVENTION

The stated object of the invention is achieved by the subject matter of the independent claims. Features of advantageous developments of the invention are set forth in the particular dependent claims. For achieving the above-mentioned object, the invention thus proposes a palletizing apparatus of at least two conveyor line sections for handling and/or conveying articles, piece goods, and/or bundles or, as the case may be, palletizable article layers, piece good layers, and/or bundle layers, where the at least two conveyor line sections have handling stations, grouping stations, and/or transfer stations in each case located consecutively in conveying direction, and where the at least two conveyor line sections lead into a centrally located integrated and/or common loading station, which comprises a common loading place for stacking and/or palletizing the article layers, piece good layers, and/or bundle layers on top of each other. In this context, it is provided that at least two vertically adjustable support surfaces and/or conveying surfaces are associated with the loading station, which support surfaces and/or conveying surfaces form parts of, or are arranged downstream in conveying direction from, the particular transfer stations of the at least two conveyor line sections, or which support surfaces and/or conveying surfaces follow the particular transfer stations of the at least two conveyor line sections present. It is furthermore provided that the common loading place is located between the vertically adjustable support surfaces and/or conveying surfaces of the transfer stations, which loading place is suppliable alternately by the at least two support surfaces and/or conveying surfaces with article layers, piece good layers, and/or bundle layers to be palletized.

In this apparatus, a lifting column, for example, with vertically adjustable guides for being able to perform the lifting and lowering of the at least two support surfaces and/or conveying surfaces independently of one another can be associated with the loading station or, as the case may be, with the transfer stations and with their at least two vertically adjustable support surfaces and/or conveying surfaces arranged upstream from the loading station. Other configurations are optionally possible, a lifting column, however, can provide a particularly compact and efficient possibility for lifting and/or conveying the article layers, piece good layers, and/or bundle layers to be palletized. When using such a lifting column or also two or more lifting columns, it can be provided that the support surfaces and/or conveying surfaces are suspended by way of traction means, such as straps, from the lifting column and are arranged thereat to be vertically motor-movable. For this purpose, electric motors can be arranged at the upper side of the lifting column, for example, to serve as drives for the liftable and lowerable support surfaces and/or conveying surfaces.

It is furthermore advantageous and beneficial for a high capacity apparatus if the at least two support surfaces and/or conveying surfaces of the transfer stations together with the loading place located therebetween are approximately aligned with each other in each particular transport direction. The conveying direction of at least one of the two support surfaces and/or conveying surfaces to the loading place can be optionally oriented substantially perpendicular to a removal direction of a finished/completed palletized stack of a plurality of article layers, piece good layers, and/or bundle layers deposited on top of each other. In such a configuration, the conveying directions of both support surfaces and/or conveying surfaces to the loading place are typically oriented substantially perpendicular to a removal direction of a finished/completed palletized stack of a plurality of article layers, piece good layers, and/or bundle layers deposited on top of each other.

In an alternative arrangement, the conveying direction of at least one of the support surfaces and/or conveying surfaces to the loading place can be optionally oriented substantially parallel to or aligned with the removal direction of a finished/completed palletized stack of a plurality of article layers, piece good layers, and/or bundle layers deposited on top of each other. Here, the in each case other conveying direction can likewise be oriented parallel to or aligned with the removal direction. Other, different orientations are equally possible so that space-saving and very flexible configurations are made possible, for example in spatially confined machine environments.

In all variants of the palletizing apparatus according to the invention, the loading place can in particular have at least one horizontal conveying element or, as the case may be, at least one such horizontal conveying element can be associated with the loading place, which horizontal conveying element is oscillatingly movable between the at least two adjustable support surfaces and/or conveying surfaces. This at least one horizontal conveying element can expediently be formed by a circulating modular conveyor belt. Optionally, the at least one horizontal conveying element can also be formed by a movable shutter element or the like, supplemented with movable braking elements and/or holding elements, as the case may be, such that transferred article layers or bundle layers can be fixed or held together in their particular layer formations. Transfer elements, such as push bars contacting from the rear, can also be used as horizontal conveying elements. In this instance, the support surface is as smooth and low-resistance as possible such that the layers to be palletized will easily slide on it. For the purpose of supporting transferred article layers, piece good layers, and/or bundle layers, it can be moreover expedient for many configurations to associate a contact element, such as a so-called braking bar, which is usable alternately for two transfer directions, with the at least one horizontal conveying element. Such a contact element or, as the case may be, such a braking bar can effectively prevent the layer formation from becoming undone or the articles, piece goods, or bundles of a layer from slightly shifting or even falling over in quick transfer or in a quick feed movement of the modular conveyor belt or of the shutter element.

According to a further embodiment variant of the palletizing apparatus according to the invention, there can be at least one apparatus associated with the loading place for depositing intermediate layers between in each case two article layers, piece good layers, and/or bundle layers, which are stacked upon each other. Such a so-called intermediate layer depositor can be arranged in the area of the loading place and/or spatially associated with the loading place. For example, movable arms, which are attached to a pivot point, or linear feed systems, which take over the intermediate layers from a stack and in each case feed them to the layers stacked on the loading place before a further layer is deposited on the top of the stack, are suited as so-called intermediate layer depositors.

In each case, different handling stations, grouping stations, transfer stations, and/or loading stations or the like can be arranged consecutively in the area of the conveyor line sections in conveying direction of the articles, piece goods, or bundles. A useful arrangement can thus provide, for example, that a so-called grouping system is present in each of the at least two conveyor line sections, which grouping system is fed by one, two or more feeder belts or the like horizontal conveying devices with articles, piece goods, or bundles to be grouped, where such a grouping system can, in particular, in each case comprise a handling station provided with grippers. These gripper can have gantry controls, for example, which can perform in each case horizontal movements and vertical movements within a given movement space in order to bring the articles, piece goods, or bundles, which are being fed in single or double lanes, into a desired grouping order. Gripper controls with articulated arm robots are equally possible. With a double-lane feed of the articles, piece goods, or bundles, at least two gripper systems in each case, which are movable independently of one another, are typically useful. Optionally, two or three such handling systems can in each case be arranged one immediately after the other within each grouping system, thus making it possible to increase the grouping speed with fast feed of the articles, piece goods, or bundles. The handling stations essentially provide for rotating and/or shifting individual, several, or even all conveyed articles, piece goods, or bundles into a desired spatial order relative to each other before they are banked up and/or pushed laterally against each other or, as the case may be, laterally centered, in a pre-grouping station arranged downstream, in each case forming complete layers without any gaps in between the individual articles, piece goods, or bundles, which have been pushed against each other and which are being further transported in the particular conveyor line sections to the next station in linear conveying direction. These consecutive stations—the handling station, as well as the pre-grouping stations with their retention bars and lateral centering bars—are usually referred to as grouping systems, and they transfer individually, consecutively conveyed articles, piece goods, or bundles, which are being conveyed by the feeder belts in the handling station, to form complete, palletizable layers.

These grouping systems are immediately followed in conveying direction by the so-called palletizing systems or palletizing stations, which have at least one so-called transfer station, which provides for further transporting the article layer, piece good layer, or bundle layer completed by means of the grouping system to a loading station arranged downstream. According to the present invention, one single common loading station is fed by at least two separate and in each case complete conveyor line sections with their own grouping system and transfer station. The loading station can optionally be arranged centrally between two conveyor line sections running parallel next to each other such that the article layers, piece good layers, or bundle layers to be stacked and/or to be palletized perform a 90-degrees change of direction between the transfer station and the loading station. Equally possible, however, are aligned arrangements in which the loading station is arranged centrally between two linearly converging conveyor line sections such that the article layers, piece good layers, or bundle layers to be stacked and/or to be palletized perform no change of direction between the transfer station and the loading station, but rather perform a change of direction by 90 degrees in relation to the original conveying directions only while being transferred from the loading station onto a depositing and stacking location, such as a pallet.

The palletizing stations, which are in each case downstream from the grouping systems, can be constructed as described below, for example. A common lifting column can be provided, for example, with a vertically movable transfer station arranged at each of the two sides (for conveyor line sections running parallel). Optionally, two such vertically movable transfer stations can be provided one after the other for each of the at least two conveyor line sections, which subsequently lead in conveying direction into the common loading station, which is likewise vertically movably. The total of two or four vertically movable transfer stations, as well as the vertically movable loading station, are each height-adjustable and movable independently of one another, and they can optionally be suspended from one common lifting column or also from two lifting columns standing next to each other.

The loading station following downstream from the transfer stations of the at least two conveyor line sections has conveying means suitable for transferring the article layers, piece good layers, or bundle layers to be stacked and/or to be palletized from the transfer stations onto the loading station. The loading station can be constructed in such a manner, for example, that a two-part shutter can remain below the particular layer buffer. While a layer is being deposited, the shutter is thus arranged in a position below the layer buffer (left and right). The layer buffer in itself can consist of a panel or of a driven modular conveyor belt. These are also each drivable independently of one another. In order to transfer the layer from the layer buffer onto the loading station in the instance of the panel design, a push and counterholder system is necessary. A braking bar serving as counterholder can be centrally arranged to act alternately on both sides.

A pallet, for example, can be located at the loading place, onto which a plurality of layers of the articles, piece goods, and/or bundles is stacked. If additional intermediate layers are to be deposited between individual layers or between all layers, it is necessary to set up a so-called intermediate layer depositor in the immediate vicinity of the loading place. In order to deposit the intermediate layers without delaying the palletizing process, the motion control of the intermediate layer depositor has to be coordinated with the control and the movement patterns of the loading station.

All stations of the palletizing apparatus according to the invention can optionally be provided with transport means, for example, with modular conveyor belts or circulating conveying means, or with sliding surfaces (tables) and corresponding pushing means. The layers can thus be shifted either actively by means of a manipulator, or by means of the conveying means itself, or by a combination of these. It is furthermore possible to use a variant in which the intermediate layers are fastened in a suitable manner to the layers at the layer buffer in the form of an adhesive point.

Besides the palletizing apparatus according to the invention as described above, the present invention comprises a method for conveying articles, piece goods, and/or bundles and/or palletizable article layers, piece good layers, and/or bundle layers within at least two conveyor line sections in each particular conveying direction by means of consecutive handling stations, grouping stations, and/or transfer stations, which conveyor line sections lead into an integrated and/or common loading station, in which the article layers, piece good layers, and/or bundle layers are stacked on top of each other and/or palletized on or in a common loading place. At least two vertically adjustable support surfaces and/or conveying surfaces are associated with and/or arranged upstream from the loading station, which support surfaces and/or conveying surfaces form parts of or, as the case may be, are associated with the particular transfer stations of the at least two conveyor line sections present. Furthermore, the common loading place is located between the vertically adjustable support surfaces and/or conveying surfaces of the transfer stations, which loading place is supplied alternately by the at least two support surfaces and/or conveying surfaces of the transfer stations with article layers, piece good layers, and/or bundle layers to be palletized. In this context, the two conveyor line sections can be optionally aligned with each other and can meet centrally in the loading station with oppositely oriented conveying directions for the articles, piece goods, and/or bundles, or, as the case may be, for the groupings or article layers, piece good layers, and/or bundle layers. Equally possible is a variant, in which the two conveyor line sections run approximately parallel or at an acute angle to each other and meet at the end of the loading station with identically oriented conveying directions or, as the case may be, with diagonally convergingly oriented conveying directions for the articles, piece goods, and/or bundles, or, as the case may be, for the groupings or article layers, piece good layers, and/or bundle layers. Mixed variants are also possible, with conveyor line sections running non-parallel and with non-precisely aligned conveyor line sections, which can be aligned at variable angles to each other.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

Figure 1:
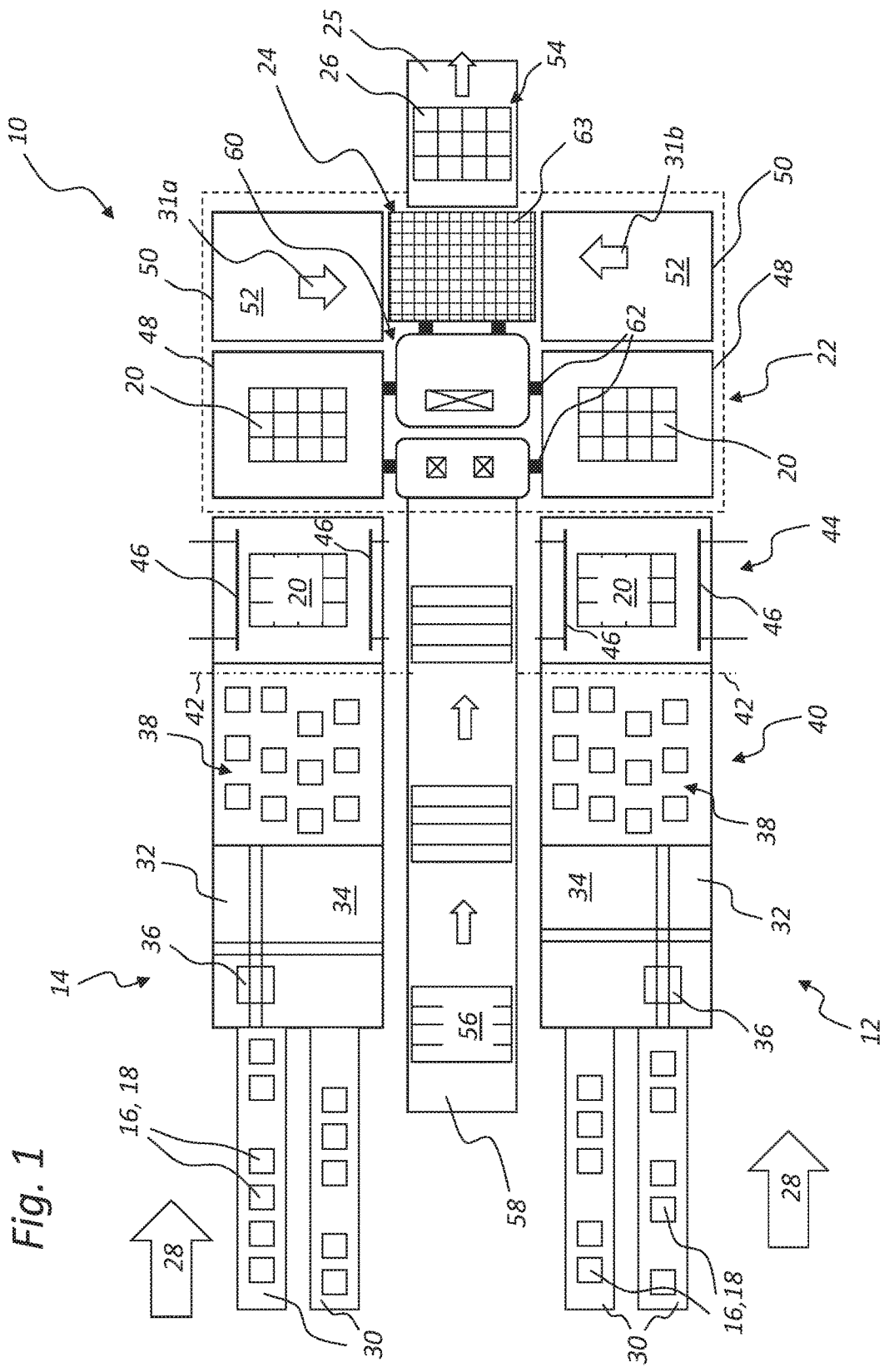
FIG. 1 shows a schematic top view onto a first embodiment variant of a palletizing apparatus according to the invention, consisting of at least two parallel-running conveyor line sections, which each serve for conveying articles, piece goods, and/or bundles, as well as for combining and assembling them to form palletizable layers.

The same or equivalent elements of the invention are designated by identical reference characters. Furthermore and for the sake of clarity, only the reference characters relevant for describing each of the figures are provided. It should be understood that the detailed description and specific examples of the embodiments of the apparatus or of the method according to the invention are intended for purposes of illustration only and are not intended to limit the scope of the invention.

The schematic top view of FIG. 1 illustrates a possible configuration of a first embodiment variant of a conveying apparatus, grouping apparatus, and/or palletizing apparatus 10 according to the invention and comprising as central components two parallel-running conveyor line sections 12 and 14, which each serve for conveying articles 16, piece goods, and/or bundles 18, as well as for combining and assembling them to form palletizable layers 20, and which lead into a common palletizing unit 22, which is illustrated in the shown exemplary embodiment of FIG. 1 framed by a broken line on the right side of the palletizing apparatus 10. An important component of the palletizing unit 22 or of this common palletizing station is a central loading station 24, which provides for stacking and palletizing the particular article layers or bundle layers 20 onto one single common loading place 25 to form a common stack 26 of layers 20 layered on top of each other. The stack 26 can take different heights, according to requirements.

As is exemplarily discernible in FIG. 1, each of the two conveyor line sections 12 and 14 present has handling stations, grouping stations, transfer stations, and/or loading stations consecutively following each other in each particular conveying direction 28, with the conveying directions 28 being parallel to each other, which handling stations, grouping stations, transfer stations, and/or loading stations lead into the integrated and/or common palletizing station 22 with its loading station 24. In each case two parallel transport belts or feeder belts 30 for horizontally conveying the articles 16, piece goods, and/or bundles 18 in conveying direction 28 in each of the two conveyor line sections 12 and 14 lead into a first handling station 32, by which the articles 16, piece goods, and/or bundles 18 are shifted and/or rotated on a support surface 34, this being potentially carried out, for example, by means of a gantry gripper system 36, which allows fast gripping, shifting, and rotating movements in all directions within the outline of the support surface 34 of the first handling station 32, in order to be able to rotate and/or shift the articles 16, piece goods, and/or bundles 18, which are being conveyed by the feeder belts 30 in a regular or irregular manner, spaced apart from each other or without gaps in between them, in the desired manner such that groupings 38 result in the area of a first pre-grouping station 40, which in each case follows the first handling station 32, so that the groupings 38 can be pushed together and compacted to article layers or bundle layers 20 there or in a consecutively following second pre-grouping station 44. Instead of the gantry gripper systems 36 indicated in each case in the area of the first handling stations 32, which gantry gripper systems 36 can be provided with vertically liftable and lowerable grippers, which are shiftable within the support surfaces 34 and thus movable parallel to the conveying direction 28 and transversely thereto, it is optionally possible to use robot grippers or the like as handling systems, which can stand, for example, at the sides of the support surfaces 34 and can be formed, in particular, by multi-axis robots.

The articles 16 or bundles 18 of the groupings 38 arranged in this manner, which articles 16 or bundles 18 are as yet still irregularly spaced apart from each other, are moved further in conveying direction 28 and are banked up by means of a retention bar 42 or the like suitable device at least by a short distance in a handling station 32, which is arranged in each case downstream from the first pre-grouping station 40, such that the spaces in conveying direction 28 between the articles 16 or bundles 18 of the particular groupings 38 are reduced or eliminated. In the second pre-grouping station 44 arranged in each case downstream in conveying direction 28 from the first pre-grouping station 40, laterally contacting push bars 46, each movable transversely to the conveying direction 28, act onto the groupings 38 from both sides such that the spaces that are transverse to the conveying direction 28 are also reduced or eliminated, whereby regular article layers or bundle layers 20 are formed with gaplessly adjacent articles 16 or bundles 18, which article layers or bundle layers 20 can have a rectangular or square outline, according to size and contours of the articles 16 or bundles 18 and according to groupings 38.

Since the support surfaces 34 in the consecutive stations 32, 40, and 44 are usually formed as movable conveying surfaces, for example as endlessly circulating modular conveyor belts or the like, a bar being lowerable in front of the grouping 38 or emerging and being lowerable between the stations 40 and 44 from below the support surface 34 normally suffices as retention bar 42 in the first pre-grouping station 40.

In the exemplary embodiment shown in FIG. 1, the palletizing station 22 comprises a total of four transfer stations 48 and 50 with in each case two transfer stations 48 and 50 arranged consecutively in conveying direction 28 and forming a part of each of the two conveyor line sections 12 or 14, as the case may be. It should be pointed out, however, that the two first transfer stations 48 arranged downstream from the second pre-grouping stations 44 on both sides of the palletizing station 22 are each movable independently of one another in a vertical direction. In contrast, the second transfer stations 50 arranged in conveying direction 28 downstream from the first transfer stations 48, are, although likewise vertically movable, only so together, and not independently of one another. Since they are mechanically connected to the central loading station 24 arranged centrally between the two second transfer stations 50, they are also only height-adjustable together with this loading station 24. They thus each form back-up surfaces for the loading station 24.

Each of the total of four first or, as the case may be, second transfer stations 48 and 50 has a vertically adjustable support surface and/or conveying surface 52 for conveying the layers 20 on different and adjustable levels of height. The in each case first transfer stations 48 each follow downstream from the particular second pre-grouping stations 44 of the two conveyor line sections 12 or 14, as the case may be. Following downstream from the first transfer stations 48 are the particular second transfer stations 50, which at the same time form the back-up surfaces for the central loading station 24. It is moreover provided that the loading station 24, which is variably height-adjustable together with the support surfaces and/or conveying surfaces 52 is located between the jointly vertically adjustable support surfaces and/or conveying surfaces 52, with the loading station 24 being alternately suppliable from the at least two support surfaces and/or conveying surfaces 52 of the second transfer stations 50 with article layers, piece good layers, and/or bundle layers 20 to be palletized. On the support surfaces and/or conveying surfaces 52 of the second transfer stations 50 serving as back-up surfaces for the loading station 24, the conveying direction or, as the case may be, the transfer direction 31a or, as the case may be, 31b for the bundle layers or article layers 20 located thereon thus in each case changes toward the central loading station 24, with the conveying directions 31a and 31b being in each case oriented perpendicular to the original conveying direction 28 and directed toward each other.

A loading place 25 consecutively follows the loading station 24 in a direction perpendicular to the transfer directions 31a or, as the case may be, 31b and parallel to the conveying direction 28. Located on the loading place 25, there can be an exchangeable pallet 54, for example, whereupon in each case a stack 26 with a plurality of layers 20 stacked on top of each other can be deposited. As soon as a stack 26 has reached a specified height, the pallet 54 together with the stack 26 located thereon can be removed and replaced by a further empty pallet 56, which can be conveyed to this location, for example, by a further feeder belt 58, which can run between the two conveyor line sections 12 and 14 and parallel to them in a conveying direction.

In the shown palletizing apparatus 10, the loading station 24, which forms a central component of the palletizing station 22, is provided with the total of four vertically adjustable support surfaces and/or conveying surfaces 52 with a lifting column 60 with vertically adjustable guides 62 for being able to perform the lifting and lowering of the transfer stations 48 and 50 with their support surfaces and/or conveying surfaces 52 independently of one another. Although other configurations for ensuring the vertical movability of the support surfaces and/or conveying surfaces 52 of the first and second transfer stations 48 and 50 are possible, the lifting column 60 shown here nevertheless provides a particularly compact and efficient possibility for lifting and/or conveying the article layers, piece good layers, and/or bundle layers 20 to be palletized. When using such a lifting column 60, it is provided that the support surfaces and/or conveying surfaces 52 are suspended by way of traction means, such as straps, from the lifting column 60 and are arranged thereat to be vertically motor-movable, in particular by way of suitable vertical carriage guidances or the like. For this purpose, electric motors can be arranged, for example, at the upper side of the lifting column 60 to serve as drives for the liftable and lowerable support surfaces and/or conveying surfaces 52.

As shown in FIG. 1, a plurality of lifting columns 60 for lifting and lowering the support surfaces of the palletizing station 22 can optionally be provided. All in all, three vertical movements performable independently of one another are possible in the exemplary embodiment shown, more specifically, the two independently performable lifting and lowering movements of the two first transfer stations 48 of the first or, as the case may be, of the second conveyor line sections 12 or 14, as the case may be, as well as, again performable independently thereof, the lifting and lowering movements of the two second transfer stations 50 together with the support surface 63 of the loading station 24 arranged therebetween. This total of three support surfaces 52 and 63 of the second transfer stations 50 or, as the case may be, of the loading station 24 arranged therebetween, in each case remain at the same height level in their lifting and lowering movements, as will be illustrated in more detail by means of the schematic front view of FIG. 4.

In order to enable problem-free shifting of complete article layers or bundle layers 20 by means of the movable support surfaces 52 in the transfer directions 31a or, as the case may be, 31b from the second transfer stations 50, and the transfer of the layer from the loading station 24 onto the loading place 25, the vertical movements of the two second transfer stations 50 are carried out synchronously with each other such that one single drive at the lifting column 60 suffices for this purpose. The support surfaces 52, which are horizontally movable and/or provided with transfer devices for the alternating transfer of layers 20 onto the support area 63 of the loading station 24, serve for transferring complete article layers or bundle layers 20 from in each one of the two left or right support surfaces 52 of the particular second transfer stations 50 of the two conveyor line sections 12 or 14. After the layer 20 has been placed centrally between the two second transfer stations 50 by means of the correspondingly movable support surfaces 52 or by means of the transfer elements, which are not illustrated here, the layer 20 can be transferred parallel to the conveying direction 28 by means of suitable transfer devices (not illustrated here), such as a slide, onto the pallet 54 standing on the loading place 25, and specifically topmost of an already previously deposited layer 20.

Push bar systems, for example, can serve as horizontal drives for the layers 20 located on the transfer stations 48 and/or 50, which are to be moved in conveying direction 28 and to be transferred to the in each case following stations. Driven modular conveyor belts with layers 20 standing thereon are alternatively suited.

Figure 2:
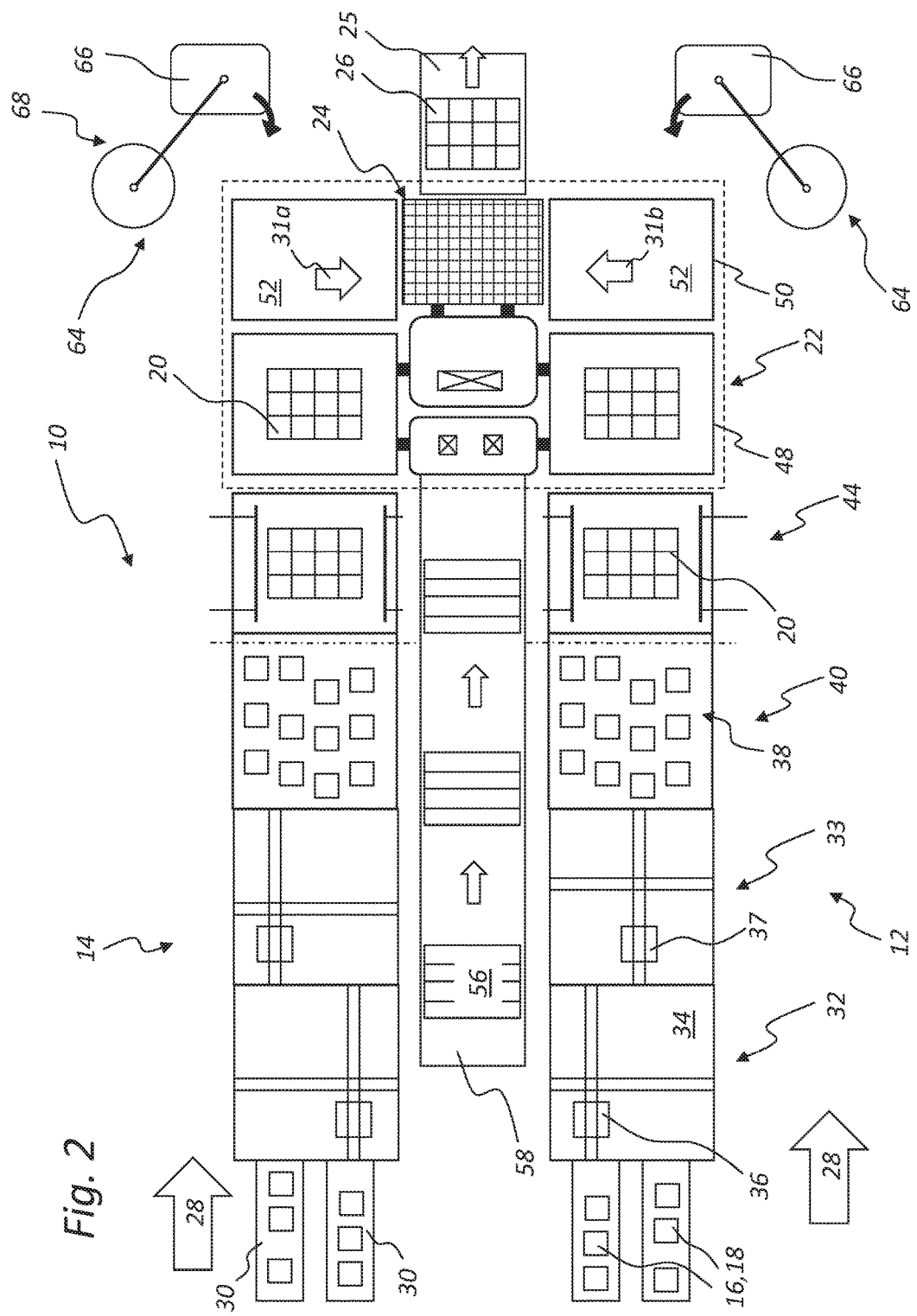
FIG. 2 shows a schematic top view onto a second embodiment variant of the palletizing apparatus according to the invention provided with a device for the feeding of intermediate layers.

The FIG. 2 shows a further schematic top view onto a second embodiment variant of the conveying apparatus, grouping apparatus, and/or palletizing apparatus 10 according to the invention, which is provided with additional devices 64 for feeding intermediate layers to the loading place 25. The intermediate layers 66 are in each case removed from intermediate layer stacks by means of rotatably movable handling devices 68, such as grippers or the like, and deposited on each individual, deposited layer 20 on the stack 26, or optionally on every other or every third layer 20, whereby the stack 26 is mechanically stabilized and the individual articles 16 or bundles 18 are prevented from shifting or tilting. In the remaining conveying process, the palletizing apparatus 10 shown in FIG. 2 largely corresponds to the palletizing apparatus shown in FIG. 1. Therefore, if in the following description of FIG. 2 individual details or elements that are designated with reference characters are not explicitly mentioned, then there are no relevant differences with regard to the variant according to FIG. 1, and in such instances the above description for FIG. 1 should be referred to.

Just like there (cf. FIG. 1), each of the two conveyor line sections 12 and 14 present has handling stations, grouping stations, transfer stations, and/or loading stations consecutively following each other in conveying direction 28 and leading into the integrated and/or common palletizing station 22. In each case two parallel transport belts or feeder belts 30 for horizontally conveying the articles 16, piece goods, and/or bundles 18 in conveying direction 28 in each of the two conveyor line sections 12 and 14 lead into a first handling station 32, by which the articles 16, piece goods, and/or bundles 18 are shifted and/or rotated on a support surface 34, for example by means of a gantry gripper system 36, which allows fast gripping, shifting, and rotating movements in all directions within the outline of the support surface 34, in order to be able to rotate and/or shift the articles 16, piece goods, and/or bundles 18, which are being conveyed by the feeder belts 30 in a regular or irregular manner, spaced apart from each other or without gaps in between them, in the desired manner such that in each case groupings 38 result, which can subsequently be pushed together and compacted to article layers or bundle layers 20. Arranged immediately downstream from the first handling station 32 is a second handling station 33, which is in turn followed downstream by the first and second pre-grouping stations 40 and 44. The further structure and the remaining configuration do not differ from the configuration of the palletizing apparatus 10 as shown in FIG. 1.

If the articles 16 or bundles 18 are being fed on the feeder belts or transport belts 30 in rapid succession and at a great density, the first and second handling stations 32 and 33 shown in FIG. 2, which handling stations 32 and 33 immediately follow each other, can provide for a faster grouping of articles 16, piece goods, or bundles 18, because some of the articles 16, piece goods or bundles 18 to be rotated and/or shifted, which pass the first handling station 32 without being influenced, can be immediately seized and shifted and/or rotated by the gantry gripper system 37 of the second handling station 33. In this way, an increased processing speed and throughput of the entire palletizing apparatus can be effected at unvarying conveying speed of the feeder belts 30.

In the variant shown in FIG. 2 it is again possible that instead of the indicated gantry gripper systems 36 and 37, which are each provided with a liftable and lowerable gripper, which is in each case movable parallel to the conveying direction 28 and transversely thereto, it is optionally possible to use robot grippers or the like as handling systems, which can stand, for example, at the sides of the support surfaces 34 and can be formed, for example, by multi-axis robots.

For the sake of completeness, it should be mentioned that in the variant according to FIG. 1 it is also possible that two, three, or more consecutive handling stations 32 and 33 are provided, even if this is not explicitly mentioned in the above description for FIG. 1.

Figure 3:
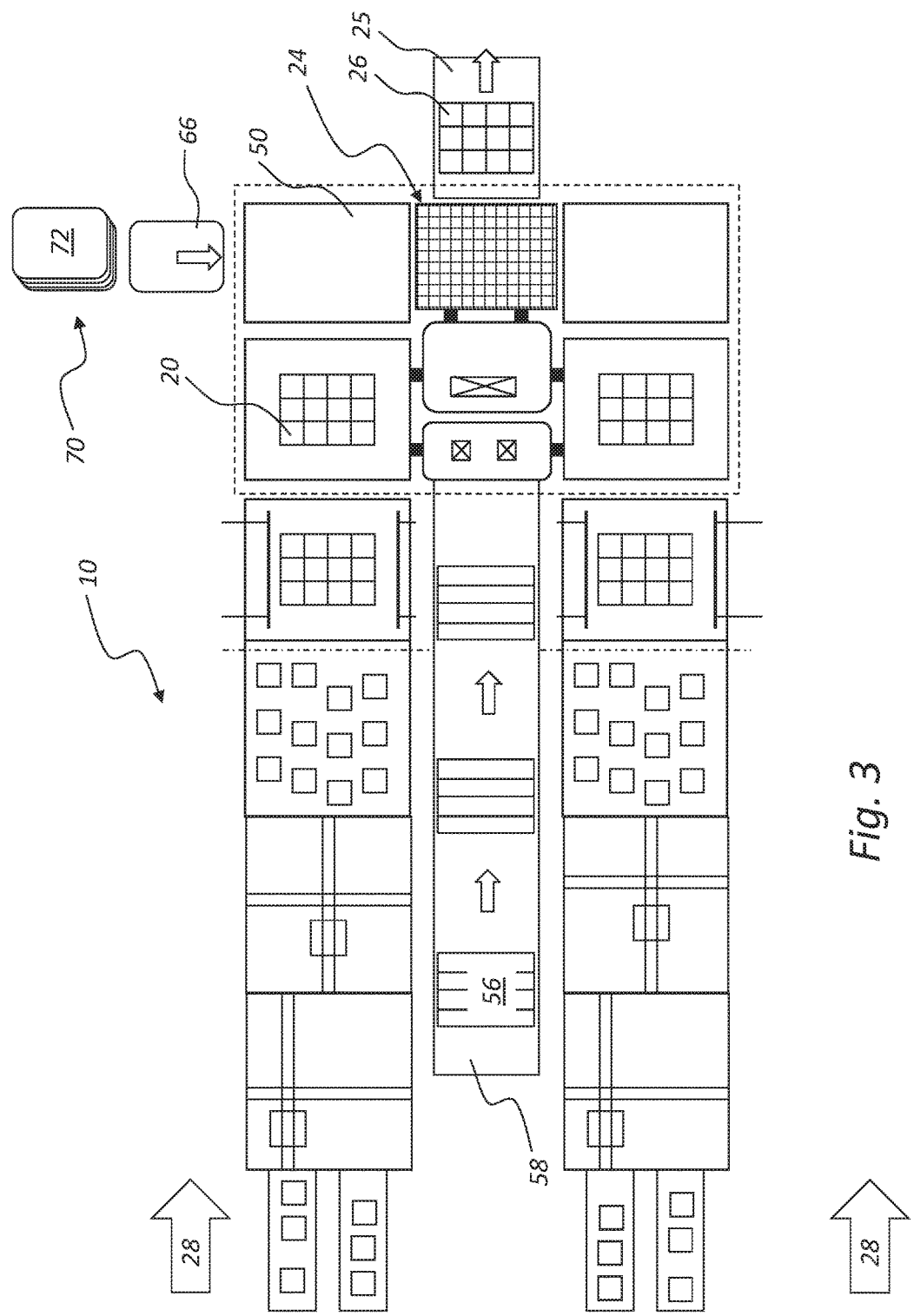
FIG. 3 shows a schematic top view onto a third embodiment variant of the palletizing apparatus according to the invention provided with an alternative device for the linear feeding of intermediate layers.

The FIG. 3 shows a schematic top view onto a third embodiment variant of the palletizing apparatus 10 according to the invention provided with an alternative handling device 70 for the linear feeding of intermediate layers 66 to the loading place 25. In this context, the intermediate layers 66 are preferably removed from at least one intermediate layer stack 72 and individually fed to the stack 26 standing on the loading place 25 such that in each case an intermediate layer 66 is placed onto each layer 20 or onto every other or every third layer 20. In the remaining conveying process, the palletizing apparatus 10 shown in FIG. 3 largely corresponds to the palletizing apparatus 10 as shown in FIG. 2. Intermediate layers 66 can optionally be fed from both sides by handling devices 70 operating in each case in a linear manner, for example when the grouped article layers or bundle layers 20 located on the second transfer stations 50 are already to be provided with individual intermediate layers 66 there, before they are deposited on the common stack 26.

It should be mentioned here again that not all details or elements that are designated with reference characters are in each case explicitly mentioned in the above description of FIG. 3; in this respect there are no differences then with regard to the variant according to FIG. 1 or with regard to the variant according to FIG. 2, and in such instances the above descriptions for FIG. 1 or, as the case may be, FIG. 2 should be referred to. For the sake of completeness, it should be mentioned that in the variant according to FIG. 3 it is also possible that two, three, or more consecutive handling stations 32 and 33 are provided.

Figure 4:
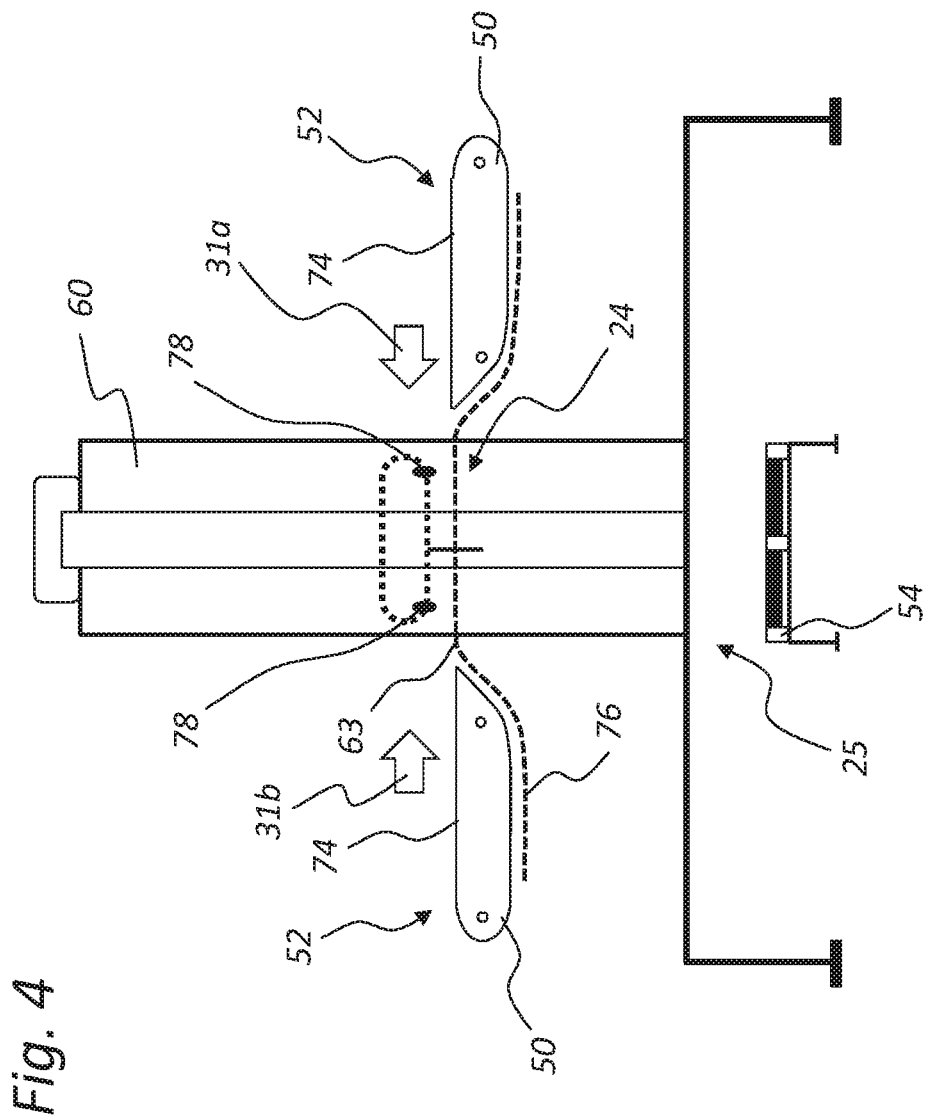
FIG. 4 shows a schematic front view of a palletizing station, which forms a part of the palletizing apparatus according to the invention as shown in FIGS. 1, 2, and/or 3.

FIG. 4 shows a schematic front view of a palletizing unit or palletizing station 22, which forms a part of the palletizing apparatus according to the invention as shown in FIG. 1, FIG. 2, and/or FIG. 3. According to these embodiment variants, the articles 16, piece goods, and/or bundles 18 to be palletized are in each case transported on the parallel-running conveyor line sections 12 and 14 and reach the particular support surfaces and/or conveying surfaces 52 of the first transfer stations 48 in the loading station 22 (cf. FIG. 1) as palletizable article layers or bundle layers 20. As already described, the transfer stations 48 are in each case movable in a vertical direction independently of one another and also independently of the second transfer stations 50 (illustrated in FIG. 4) arranged in each case downstream, this being ensured by way of the motor-operated suspensions and guides 62 at the lifting column 60. The first transfer stations 48 are therefore brought into an appropriate vertical position in coordination with the second transfer stations 50 arranged downstream, before the layers 20 are in each case transferred onto the second transfer stations 50. The conveying movement of the layers 20 on the particular support surfaces and/or conveying surfaces 52 of the first and second transfer stations 48 and 50 can be carried out, for example, by way of suitable horizontal conveying devices, such as modular conveyor belts, link chains, or also by way of lowerable push bars, which are movable parallel to the conveying surface 52.

Up to the second transfer station 50, the movement of the articles 16, piece goods, and/or bundles 18, as well as of the groupings 38 and the layers 20 that have been pushed together, is carried out on the corresponding conveyor line sections 12 and 14 in each case in linear conveying direction 28. As is discernible in FIGS. 1 to 3, the further movement of the layers 20 from the second transfer stations 50 to the centrally arranged support surface 63 of the loading station 24 then has to be carried out in perpendicular thereto, that is, in the transfer directions 31a or 31b, as the case may be (cf. FIG. 1). According to FIG. 4, the two support surfaces and/or conveying surfaces 52 of the second transfer stations 50 are suspended together from the lifting column 60 and are movable together in a vertical direction for this purpose. In addition, each of the two second transfer stations 50 can have an endlessly circulating conveying surface 74 or a push bar or the like, which is movable transversely to the conveying direction 28 and which contacts the layers 20 from the back and can push them in each transfer direction 31a or, as the case may be, 31b to the support surface 63 of the loading station 24. Preferably, in this instance, a counterholder bar and/or braking bar 78 contacting the layers 20 from the front side can be present for being able to prevent shifting or tilting of the articles 16 or bundles 18 of the particular layer 20 during their shifting movements. The endlessly circulating conveying surfaces 74 can be formed by driven modular conveyor belts, for example.

Furthermore discernible from FIG. 4 is an embodiment variant of the movable support area 63, which connects the two second transfer stations 50 to each other. A two-part shutter 76 can thus be arranged in such a manner as to remain below the particular second transfer stations 50, which in each case serve as layer buffers or, as the case may be, as back-up surfaces for the loading station 24 arranged therebetween. While a layer 20 is being deposited, the shutter 76 is thus arranged in a position below the particular second transfer stations 50 or, as the case may be, below the layer buffer (left and right). As mentioned, the transfer stations 50 themselves can consist of a panel or of a driven modular conveyor belt as circulating conveying surfaces 74. These are also each driveable independently of one another. When designed as a panel, a pusher and counterholder system are necessary for transferring the layer 20 from the layer buffer or, as the case may be, from the transfer stations 50 onto the movable support area 63 of the loading station 24, from where the layer 20 can be transferred onto the loading place 25 or the pallet 54, as the case may be, and onto the stack 26. An optional braking bar 78 for stabilizing the layers 20 in their transfer movement can be arranged in the center to act alternately on both sides.

Figure 5:
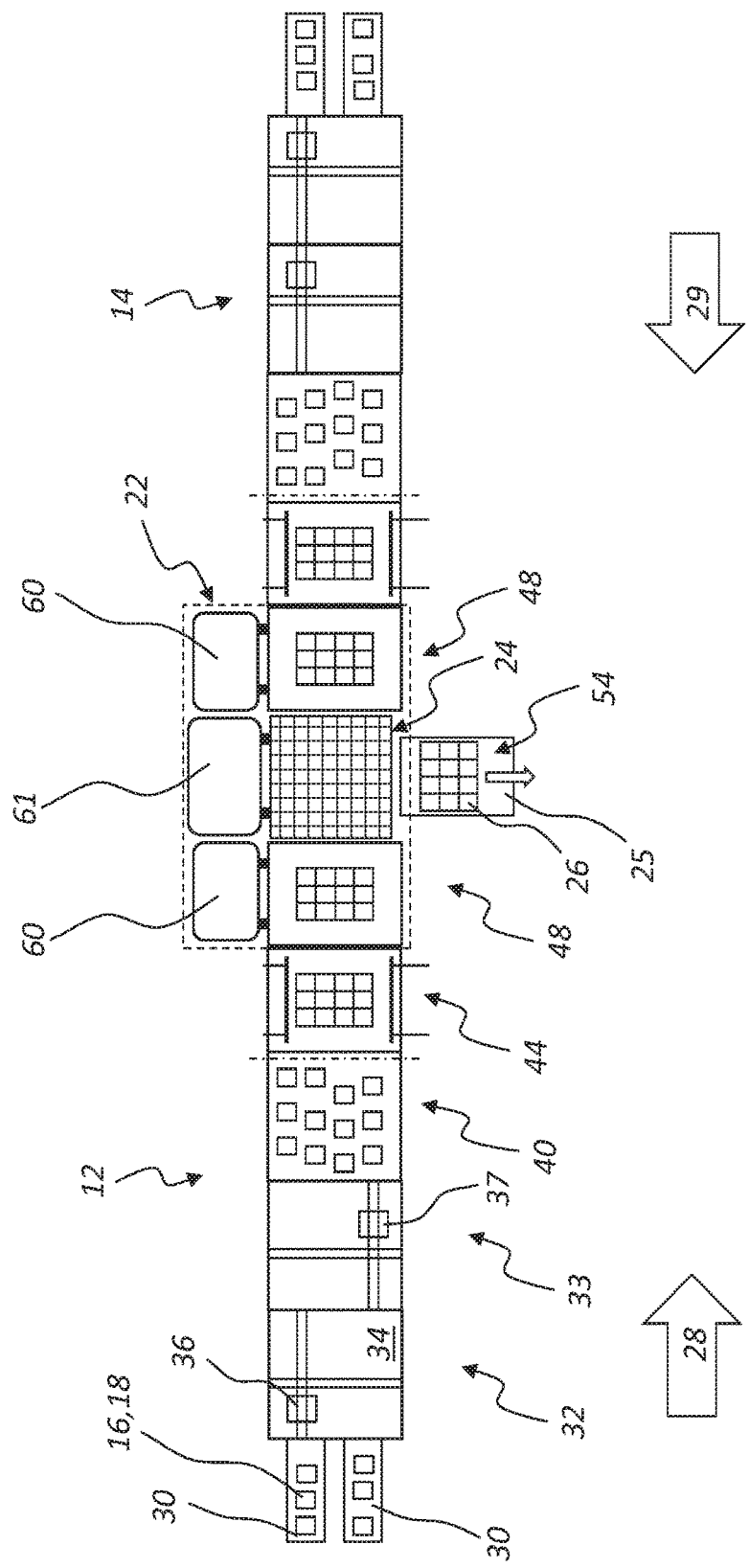
FIG. 5 shows a schematic top view onto a fourth embodiment variant of the palletizing apparatus according to the invention, consisting of two conveyor line sections running in an aligned arrangement and meeting in a common palletizing station.

The schematic top view of FIG. 5 shows a fourth embodiment variant of the conveying apparatus, grouping apparatus, and/or palletizing apparatus 10 according to the invention, consisting of two conveyor line sections 12 and 14 running in aligned arrangement, which conveyor line sections 12 and 14 meet centrally at a common palletizing station 22 or, as the case may be, a loading station 24. As in the variants according to FIG. 2 and FIG. 3, each of the two converging conveyor line sections 12 and 14 has handling stations, grouping stations, transfer stations, and/or loading stations consecutively following each other in conveying direction 28 or 29, as the case may be, and leading into the integrated and/or central loading station 24 or palletizing station 22, as the case may be. In each case two parallel transport belts or feeder belts 30 for horizontally conveying the articles 16, piece goods, and/or bundles 18 in conveying direction 28 or 29, as the case may be, in each of the two conveyor line sections 12 and 14 lead into the first handling station 32, by which the articles 16, piece goods, and/or bundles 18 are shifted and/or rotated on a support surface 34, for example by means of a gantry gripper system 36, which allows fast gripping, shifting, and rotating movements in all directions within the outline of the support surface 34, in order to be able to rotate and/or shift the articles 16, piece goods, and/or bundles 18, which are being conveyed by the feeder belts 30 in a regular or irregular manner, spaced apart from each other or without gaps in between them, in the desired manner such that in each case groupings 38 result, which can subsequently be pushed together and compacted to article layers or bundle layers 20. Arranged in each case immediately downstream from the first handling station 32 is a second handling station 33, which is in turn followed downstream by the first and second pre-grouping stations 40 and 44. The structure and configuration of each of the conveyor line sections 12 and 14 does not differ in this respect from the configurations of the palletizing apparatus 10 as shown in the FIGS. 2 and 3. For the purpose of better illustrating the area of the palletizing station 22, it is designated by a broken-line box.

If the articles 16 or bundles 18 are being fed on the feeder belts or transport belts 30 in rapid succession and at a great density, the first and second handling stations 32 and 33 shown in FIG. 5, which handling stations 32 and 33 immediately follow each other, can provide for a faster grouping of articles 16, piece goods, or bundles 18, because some of the articles 16, piece goods or bundles 18 to be rotated and/or shifted, which pass the first handling station 32 without being influenced, can be immediately seized and shifted and/or rotated by the gantry gripper system 37 of the second handling station 33. In this way, the processing speed and the throughput of the entire palletizing apparatus can be increased without varying the conveying speed of the feeder belts 30. In the variant shown in FIG. 5, it is again possible that instead of the indicated gantry gripper systems 36 and 37, which are each provided with liftable and lowerable grippers, which are in each case movable parallel to the conveying direction 28 and transversely thereto, it is optionally possible to use robot grippers or the like as handling systems, which can stand, for example, at the sides of the support surfaces 34 and can be formed, for example, by multi-axis robots.

Due to the different spatial arrangement of the first transfer stations 48 following downstream from the first and/or second pre-grouping stations 40 or 44, as the case may be, these transfer stations 48 in each case have a separate first lifting column 60 whereby they are vertically movable independently of one another. The loading station 24 located therebetween likewise has a separate second lifting column 61 whereby the transfer stations 48 and the loading station 24 are in each case separately adjustable in a vertical direction. The construction of the loading station 24 can nevertheless largely correspond to the variant shown in FIG. 4, and it can be provided with a two-part shutter 76 as shown there, whereby the layers 20, in each case coming in conveying direction 28 or, as the case may be, 29 from the transfer stations 48, can be transferred. The layer 20 located on the shutter 76 or, as the case may be, on its movable support area 63, can subsequently be deposited in an appropriate vertical position on the outlet of the loading place 25 or, as the case may be, on the stack 26 standing on the pallet 54.

The palletizing apparatus 10 according to FIG. 5 can optionally be provided with additional devices for feeding intermediate layers to the loading place 25 according to FIG. 2 or according to FIG. 3. Likewise, a feeder belt for empty pallets (cf. FIGS. 1 to 3) can be optionally provided at a suitable location, by means of which feeder belt a plurality of empty pallets can be conveyed to the loading place 25 as soon as a pallet 54 with a layer stack 26 located thereon has been removed.

All variants of the palletizing apparatus 10 explained in the FIG. 1 to FIG. 5 are in each case to be understood such that all stations of the apparatus can optionally be provided with transport means (for example with modular conveyor belts) or also with sliding surfaces (tables). The groupings 38 or layers 20 can thus be shifted either actively by means of a manipulator, or by means of the conveying means itself, or by a combination of both conveying elements. For the purpose of clarity, not all required centering means are illustrated in the drawing. As the case may be, there may additionally be a variant in which the intermediate layers are fastened in a suitable manner to the layer 20 at the layer buffer in the form of an adhesive point.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Apparatus, conveying apparatus, grouping apparatus, palletizing apparatus
12 First conveyor line section
14 Second conveyor line section
16 Articles
18 Bundles
20 Layer, article layer, bundle layer, piece goods layer
22 Palletizing unit, palletizing station
24 Loading station
25 Loading place
26 Stack, layer stack
28 Conveying direction (of the first and second conveyor line sections)
29 Conveying direction (of the second conveyor line section)
30 Conveyor belt, feeder belt
31a First transfer direction
31b Second transfer direction
32 Handling station, first handling station
33 Second handling station
34 Support surface (of the handling station)
36 Gantry gripper system (of the first handling station)
37 Gantry gripper system (of the second handling station)
38 Grouping, article grouping, bundle grouping
40 First pre-grouping station
42 Retention bar
44 Second pre-grouping station
46 Push bar
48 First transfer station
50 Second transfer station
52 Support surface, conveying surface
54 Pallet
56 Empty pallet
58 Further feeder belt
60 Lifting column, first lifting column
61 Lifting column, second lifting column
62 Guiding devices
63 Support area, support surface (of the loading station)
64 Device for supplying intermediate layers
66 Intermediate layer
68 Handling device
70 Handling device
72 Intermediate layer stack
74 Conveying surface, circulating conveying surface
76 Shutter, two-part shutter
78 Braking bars, circulating braking bars, contact bars

The invention claimed is:

1. A palletizing apparatus (10) for conveying articles (16), piece goods, and/or bundles (18) and/or palletizable article layers, piece good layers, and/or bundle layers (20), comprising:
    at least two conveyor line sections (12, 14) with each conveyor line section (12, 14) including a first transfer station (48) and a second transfer station (50), with each of the first and second transfer station including a vertically adjustable support surface and/or conveying surface (52), and
    a central loading station (24), wherein the at least two conveyor line sections (12, 14) lead into the central loading station (24); and
    a common loading place (25) for stacking and/or palletizing the article layers, piece good layers, and/or bundle layers (20) on top of each other received from the central loading station,
    wherein at least two of the vertically adjustable support surfaces and/or conveying surfaces (52) are adjacent to the central loading station (24), and
    the central loading station (24) is located therebetween and is alternately suppliable by the at least two vertically adjustable support surfaces and/or conveying surfaces (52) with article layers, piece good layers, and/or bundle layers (20) to be palletized, and
    wherein the vertically adjustable support surfaces and/or conveying surfaces (52) of each first transfer station (48) are independently movable of each other and independently movable of each vertically adjustable support surfaces and/or conveying surfaces (52) of the second transfer stations (50), and wherein the vertically adjustable support surface and/or conveying surface (52) of each second transfer station (50) are not independently movable of each other.

2. The palletizing apparatus of claim 1, further comprising at least one lifting column (60, 61) associated with the central loading station (24), wherein the at least one lifting column (60, 61) comprises one or more vertically adjustable guides (62).

3. The palletizing apparatus of claim 2, wherein the support surfaces and/or conveying surfaces (52) adjacent to the loading station (24) located therebetween, are approximately aligned with each other in each conveying direction (28, 29).

4. The palletizing apparatus of claim 2, wherein a transfer direction (31a, 31b) of at least one of the at least two support surfaces and/or conveying surfaces (52) is oriented substantially perpendicular to a removal direction.

5. The palletizing apparatus of claim 4, wherein the loading station (24) comprises at least one horizontal conveying element (76), which is oscillatingly movable between each of the vertically adjustable support surfaces and/or conveying surfaces (52).

6. The palletizing apparatus of claim 5, further comprising a bar (78) associated with the at least one horizontal conveying element.

7. The palletizing apparatus of claim 6, wherein the at least one horizontal conveying element is formed by a circulating modular conveyor belt.

8. The palletizing apparatus of claim 6, wherein the at least one horizontal conveying element is formed by a movable shutter element (76).

9. The palletizing apparatus of claim 4, wherein at least one apparatus (64, 68, 70) is associated with the loading place (25) for the purpose of depositing intermediate layers (66) between two article layers, piece good layers, and/or bundle layers (20).

10. The palletizing apparatus of claim 2, wherein a transfer direction (31a, 31b) of at least one of the at least two support surfaces and/or conveying surfaces (52) is oriented substantially parallel to or aligned with a removal direction.

11. The palletizing apparatus of claim 10, wherein the loading station (24) comprises at least one horizontal conveying element (76), which is oscillatingly movable between each of the vertically adjustable support surfaces and/or conveying surfaces (52).

12. The palletizing apparatus of claim 11, further comprising a bar (78) associated with the at least one horizontal conveying element.

13. The palletizing apparatus of claim 12, wherein the at least one horizontal conveying element is formed by a circulating modular conveyor belt.

14. The palletizing apparatus of claim 12, wherein the at least one horizontal conveying element is formed by a movable shutter element (76).

15. The palletizing apparatus of claim 10, wherein at least one apparatus (64, 68, 70) is associated with the loading place (25) for the purpose of depositing intermediate layers (66) between two article layers, piece good layers, and/or bundle layers (20).

16. A method for palletizing articles (16), piece goods, and/or bundles (18) comprising:
   forming article layers, piece good layers, and/or bundle layers (20) by supplying articles, piece goods, and/or bundles to a first transfer stations (48) and a second transfer station (50) located in each of at least two conveyor line sections (12, 14), with each first and second transfer station including a vertically adjustable support surface and/or conveying surface (52),
   alternately supplying article layers, piece good layers, and/or bundle layers (20), from at least two vertically adjustable support surfaces and/or conveying surfaces (52),
   stacking on top of each other and/or palletizing the article layers, piece good layers, and/or bundle layers (20) at the central loading station (24) and transferring the stacked and/or palletized articles, piece goods, and/or bundles to a common loading place (25),
   wherein the common loading station (24) is located between the at least two vertically adjustable support surfaces and/or conveying surfaces (52) of the transfer stations (48, 50), and
   wherein the vertically adjustable support surfaces and/or conveying surfaces (52) of each first transfer station (48) are independently movable of each other and independently movable of each vertically adjustable support surfaces and/or conveying surfaces (52) of the second transfer stations (50), and wherein the vertically adjustable support surfaces and/or conveying surfaces (52) of each second transfer station (50) are not independently movable of each other.

17. The method of claim 16, wherein the least two conveyor line sections (12, 14) have oppositely oriented conveying directions (28, 29).

18. The method of claim 16, wherein the at least two conveyor line sections (12, 14) have parallelly oriented conveying directions (28).

* * * * *